A. B. PIERSON.
Seed-Planter.
No. 225,022.  Patented Mar. 2, 1880.
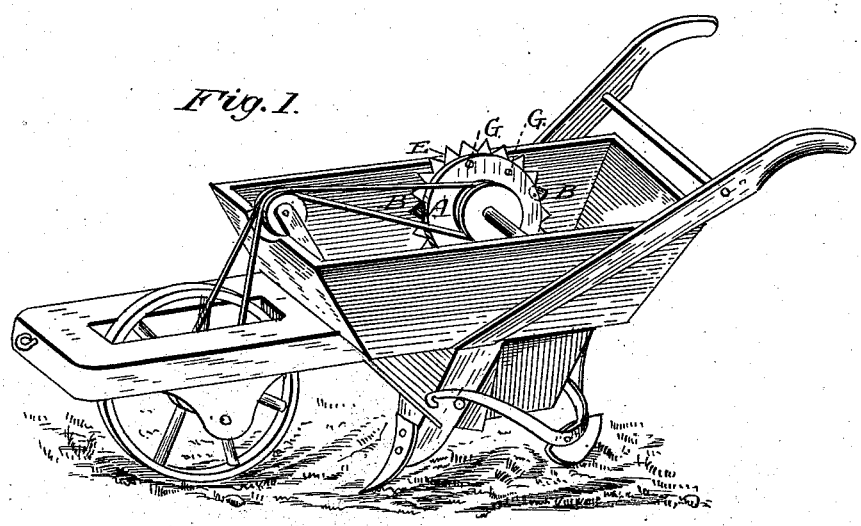
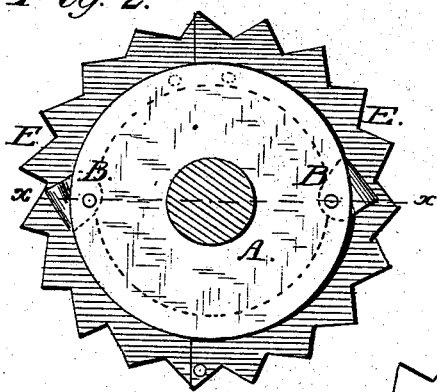
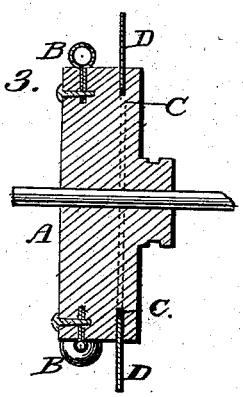
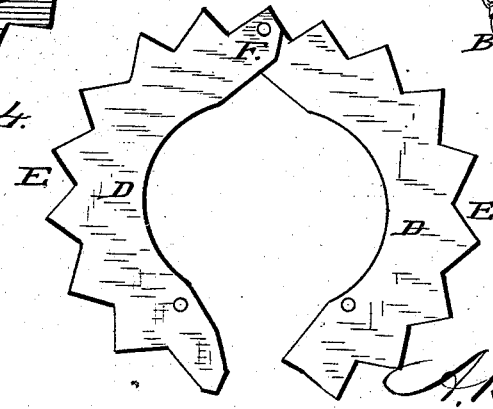

UNITED STATES PATENT OFFICE.

ABRAM B. PIERSON, OF MONTGOMERY, ALABAMA.

SEED-PLANTER.

SPECIFICATION forming part of Letters Patent No. 225,022, dated March 2, 1880.

Application filed August 12, 1879.

*To all whom it may concern:*

Be it known that I, ABRAM B. PIERSON, of Montgomery, in the county of Montgomery and State of Alabama, have invented certain new and useful Improvements in Seed-Planters; and I do hereby declare that the following is a full, clear, and exact description of the invention, which will enable others skilled in the art to which it appertains to make and use the same, reference being had to the accompanying drawings, which form a part of this specification.

Figure 1 is a perspective view of a seed-planter equipped with my improvement. Fig. 2 is a side view of the bucket-wheel having my improvement attached. Fig. 3 is a sectional view on the line $x\,x$, Fig. 2; and Fig. 4 is a view of the toothed plate detached from the bucket-wheel.

Corresponding parts in the several figures are denoted by like letters of reference.

This invention relates to an improved attachment to a bucket-wheel seed-planter, by which it may be adapted to sow cotton-seed, or to be used as a fertilizer-distributer; and it consists in certain improvements in the construction and arrangement of parts, which will be hereinafter fully described, and particularly pointed out in the claims.

The construction of the planter need not differ from that patented to me on July 8, 1879, No. 217,237, although my invention is applicable to any other suitably-constructed seed-planter.

A in the drawings represents the bucket-wheel, which is provided with the buckets B B. Besides the buckets the wheel A is provided with a circumferential groove or kerf, C.

D D are two segmental or curved plates, the outer edges of which are serrated or provided with teeth E. At one end the plates D D are hinged or pivoted together by a pin, F, so that by spreading them apart they may be adjusted in the kerf C, where they are held securely by screws G inserted from the outside of the wheel or disk, or by other suitable means.

In operation, the effect of the toothed circumferential plates is to stir the seed or fertilizing material.

When corn is to be planted the attachment may be readily detached.

Having thus described my invention, I claim and desire to secure by Letters Patent of the United States—

1. An attachment for seed-planters, consisting of the curved or segmental plates D D, hinged together at one end and having toothed outer edges, as set forth.

2. The combination, with a seed-planter bucket-wheel having circumferential groove or kerf C, of the curved or segmental plates D D, hinged together at one end and having toothed outer edges, as set forth.

In testimony that I claim the foregoing as my own I have hereto affixed my signature in presence of two witnesses.

ABRAM B. PIERSON.

Witnesses:
GEORGE CONNELL,
T. M. C. WILSON.